(12) United States Patent
Stauder et al.

(10) Patent No.: US 8,941,679 B2
(45) Date of Patent: Jan. 27, 2015

(54) METHOD OF CREATING A GAMUT BOUNDARY DESCRIPTOR PRESERVING THE DISCONTINUITIES OF AN ACTUAL GAMUT SURFACE

(75) Inventors: Jurgen Stauder, Montreuil-sur Ille (FR); Laurent Blonde, Thorigne Fouillard (FR); Patrick Morvan, Laille (FR)

(73) Assignee: Thomson Licensing (FR)

( * ) Notice: Subject to any disclaimer, the term of this patent is extended or adjusted under 35 U.S.C. 154(b) by 769 days.

(21) Appl. No.: 12/452,294

(22) PCT Filed: Jun. 26, 2008

(86) PCT No.: PCT/EP2008/058215
§ 371 (c)(1),
(2), (4) Date: Sep. 8, 2010

(87) PCT Pub. No.: WO2009/000904
PCT Pub. Date: Dec. 31, 2008

(65) Prior Publication Data
US 2010/0328341 A1    Dec. 30, 2010

(30) Foreign Application Priority Data

Jun. 27, 2007    (EP) .................................... 07301166

(51) Int. Cl.
*G09G 5/02* (2006.01)
*H04N 1/60* (2006.01)

(52) U.S. Cl.
CPC ........... *H04N 1/6058* (2013.01); *H04N 1/6016* (2013.01)
USPC ........................................................ 345/593

(58) Field of Classification Search
None
See application file for complete search history.

(56) References Cited

U.S. PATENT DOCUMENTS

| 5,596,428 | A | | 1/1997 | Tytgat et al. | |
|---|---|---|---|---|---|
| 5,704,026 | A | * | 12/1997 | Wan | ............................... 345/590 |
| 5,721,572 | A | * | 2/1998 | Wan et al. | ...................... 345/590 |
| 5,751,926 | A | | 5/1998 | Kasson et al. | |

(Continued)

FOREIGN PATENT DOCUMENTS

| EP | 1694054 | 8/2006 |
|---|---|---|
| JP | 8056289 | 2/1996 |

(Continued)

OTHER PUBLICATIONS

Borouchaki, et al., "Surface mesh enhancement with geometric singularities identification", Comput. Methods Appl. Mech. Engrg. 194 (2005), 4885-4894.*

(Continued)

*Primary Examiner* — Kee M Tung
*Assistant Examiner* — William Beutel
(74) *Attorney, Agent, or Firm* — Jack Schwartz and Associates, PLLC (57) ABSTRACT

In order to preserve the discontinuities of an actual gamut surface and/or the discontinuities of its curvature, notably through a smoothing operation, in this method, when at least a vertex of any elementary polygon, the network of which represents an actual gamut boundary, belongs either to a line or a point of discontinuity of this actual gamut boundary, either to a line or a point of discontinuity of curvature of said actual gamut boundary, or both, metadata related to this belongings are added to the definition of the elementary polygons.

7 Claims, 4 Drawing Sheets

(56) References Cited

U.S. PATENT DOCUMENTS

| | | | |
|---|---|---|---|
| 5,832,109 A * | 11/1998 | Mahy | 382/162 |
| 6,400,467 B1 | 6/2002 | Harrington | |
| 6,480,301 B1 * | 11/2002 | Cholewo | 358/1.9 |
| 7,701,465 B2 * | 4/2010 | Suzuki et al. | 345/601 |
| 7,876,322 B2 * | 1/2011 | Xie et al. | 345/428 |
| 2002/0008710 A1 | 1/2002 | Someya et al. | |
| 2002/0080232 A1 | 6/2002 | Hiratsuka et al. | |
| 2005/0146736 A1 | 7/2005 | Matsuoka et al. | |
| 2005/0248784 A1 | 11/2005 | Henley et al. | |
| 2006/0114483 A1 | 6/2006 | Nishimura | |
| 2006/0164662 A1 | 7/2006 | Tin | |
| 2006/0176529 A1 | 8/2006 | Ito et al. | |
| 2006/0193018 A1 | 8/2006 | Ito et al. | |
| 2006/0262360 A1 | 11/2006 | Dalrymple et al. | |
| 2007/0285688 A1 * | 12/2007 | Higashikata et al. | 358/1.9 |
| 2008/0225021 A1 * | 9/2008 | Hekstra et al. | 345/204 |

FOREIGN PATENT DOCUMENTS

| | | |
|---|---|---|
| JP | 2004140645 | 5/2004 |
| JP | 2004166045 | 6/2004 |
| JP | 2006109394 | 4/2006 |
| JP | 2006140972 | 6/2006 |
| JP | 2006197080 | 7/2006 |
| JP | 2006203526 | 8/2006 |
| JP | 2006217150 | 8/2006 |
| WO | WO2006050305 | 5/2006 |

OTHER PUBLICATIONS

Jiao (Xiangmin Jiao, "Volume and Feature Preservation in Surface Mesh Optimization", Proceedings of the 15th International Meshing Roundtable, 2006, pp. 359-373).*

Dong-Woo Kang et al.: "Color signal decomposition method using 3-D Gamut boundary of multi-primary display" IEEE International Conference on Image Processing ICIP, vol. 1, Sep. 11, 2005, pp. 401-404, XP002454418.

Jean-Daniel Boissonnat et al. "Smooth surface reconstruction via natural neighbour interpolation of distance functions" Symposium on Computational Geometry, Jan. 2-Dec. 31, 2000, p. 223-232, XP002454419.

Ethan D. Montag et al. "Gamut mapping: evaluation of chroma clipping techniques for three destination gamuts" IS&T/SID Sixth Color Imaging Conference: Color Science, Systems and Applications, vol. 6, Nov. 1, 1998-Nov. 30, 1998, pp. 57-61, XP002454420. Search Report Dated Jan. 7, 2009.

"Convex Hull Algorithms", http://www.cse.unsw.edu.au/~lambert/java/3d/hull.html, Mar. 14, 2007, pp. 1-17.

Thomson, Andrew, "3-Dimensional Geometry: Solid Angles and Girard's Theorem", University of British Columbia Math 308, Dec. 16, 2005, pp. 1-10.

* cited by examiner

METHOD OF CREATING A GAMUT BOUNDARY DESCRIPTOR PRESERVING THE DISCONTINUITIES OF AN ACTUAL GAMUT SURFACE

This application claims the benefit, under 35 U.S.C. §365 of International Application PCT/EP2008/058215, filed Jun. 26, 2008, which was published in accordance with PCT Article 21(2) on Dec. 31, 2008 in English and which claims the benefit of European patent application No. 07301166.0, filed Jun. 27, 2007.

BACKGROUND OF THE INVENTION

1. Field of the Invention

The invention relates to a method of creating a gamut boundary descriptor of the actual gamut boundary of a color device and to a method of gamut mapping source colors of a source color device into target colors of a target color device in a transformation color space using such method of creating a gamut boundary descriptor.

2. Description of Related Art

Figure 1:
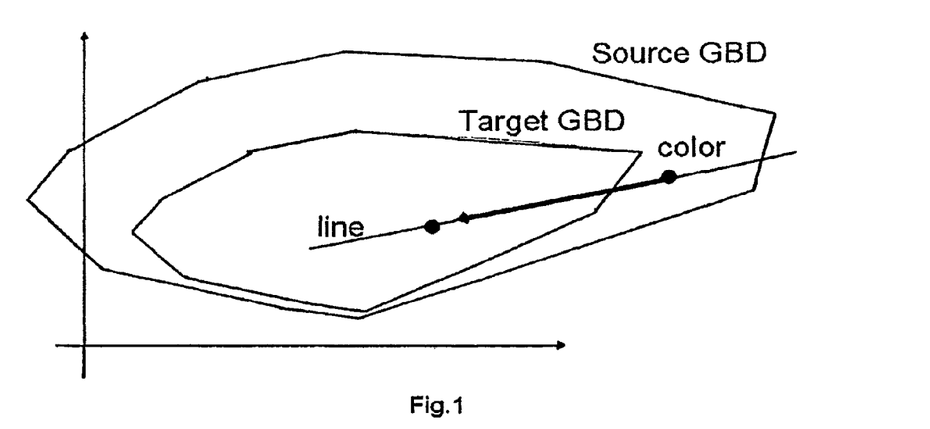
FIG. 1, already mentioned, describes the mapping along a line of colors from a source gamut into a target gamut, both gamut having surface singularities such as summits.

FIG. 1 shows the geometry of a sample two-dimensional gamut mapping (GM) algorithm that maps colors along a line from a source gamut of a color device using a Gamut Boundary Description (GBD) into a target gamut of another color device using another Gamut Boundary Description (GBD). Usually, GM algorithms determine intersections of the line with source and target GBDs and then determine a one-dimensional mapping function for each color on the line that indicates how far it should be moved along the line for a given color to be mapped. GBD are often based on a network of polygons in 3D space (2D GBD) or a polygon in 2D space (1D GBD) such as in FIG. 1. Such GBD are approximated or interpolated representations of the true or actual gamut boundary. In a simplest form, a GBD can consist in a number of vertices. In this case the GBD is a sampling of the true or actual gamut boundary.

U.S. Pat. No. 5,721,572 (see notably col. 2, lines 61-67) discloses a method of creating a gamut boundary descriptor (GBD) of the actual gamut boundary of a color device comprising the steps of:

in a transformation color space, selecting gamut boundary colors sampling the surface of said actual gamut boundary, by using said selected gamut boundary colors, generating a network of elementary polygons representing said actual gamut boundary, each selected gamut boundary color belonging to an elementary polygon, from said network of elementary polygons, generating said gamut boundary descriptor (GBD). In U.S. Pat. No. 5,721,572, each elementary polygon defines a local surface, called facet; see FIG. 8 of this document where these polygons are triangles.

Figure 2:
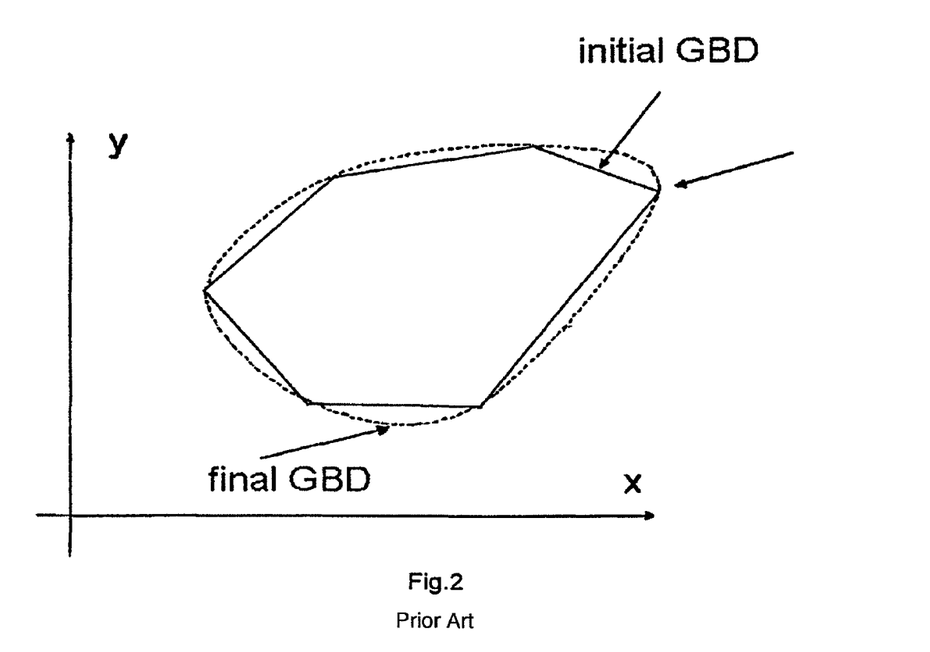
FIG. 2, already mentioned, describes the final GBD that is obtained from an initial GBD according to the prior art.

More precisely, in the INRIA research report 3985 from August 2000 entitled "Smooth Surface Reconstruction via Natural Neighbour Interpolation of Distance Functions", Jean-Daniel Boissonnat and Frédéric Cazals describe a more sophisticated generation of a gamut boundary descriptor by adding a so-called smoothing operation of an initial GBD made of the network of elementary polygons; such a method allows the creation of a gamut boundary descriptor that is closer to the actual gamut boundary than the basic network of elementary polygons that forms the initial GBD. The problem is that the interpolation algorithm smoothes also the shape singularities of the actual gamut boundary such its edges and summits, which leads to erroneously smoothed final GBD such as shown in FIG. 2. Often, GBD are then generated by interpolation or smoothing at intermediate positions (over sampled) or even approximated by curves or curved surfaces such as splines.

Summits in 1D GBD such as in FIG. 2 or summits and edges (line segments) in 2D GBD cannot be detected from the GBD itself. As shown in FIG. 2, it can usually not be known if one of the vertices represents a summit or not. For example, evaluating the "sharpness" of the surface of a GBD at a vertex is not sufficient. On the one hand, a vertex with very "sharp" surface can just be a normal vertex in a case where the sampling rate of the actual gamut boundary is too low. In this case, a smooth interpolation can even help. On the other hand, a vertex with smooth shape may represent a smooth summit.

SUMMARY OF THE INVENTION

An object of the invention is to generate a gamut boundary descriptor that is closer to the actual gamut boundary than the gamut boundary descriptor of the prior art, even after smoothing or interpolation of the basic network of elementary polygons that is used to represent this gamut boundary.

For this purpose, a subject of the invention is a method of creating a gamut boundary descriptor of the actual gamut boundary of a color device comprising the steps of:

in a transformation color space, selecting gamut boundary colors sampling the surface of said actual gamut boundary, by using said selected gamut boundary colors, generating a network of elementary polygons representing said actual gamut boundary, each selected gamut boundary color belonging to an elementary polygon, generating said gamut boundary descriptor from said network of elementary polygons, wherein, when at least a vertex of any elementary polygon belongs to a line or a point of discontinuity of said actual gamut boundary, and/or belongs to a line or a point of discontinuity of curvature of said actual gamut boundary, metadata related to this belongings are added to the definition of said elementary polygon.

A color device means any kind of image output device, e.g. a film projector, a digital projector, a CRT or LCD monitor, a Digital Video Disc (DVD) storage device with linked monitor or a video cassette storage device with linked monitor, or any kind of image input or capturing device, e.g. a film camera in combination with a film scanner, an electronic camera, or an intermediate color device, for example a film printer (but without film projector), a color correction device (but without display) or any other color device working on color images.

The actual gamut of color device includes all the colors that can be inputted or outputted by the color device. The actual gamut boundary of this color device is the 2D surface that limits this actual gamut.

A transformation color space is preferably an device-independent color space, as the XYZCIE color space; perceptually uniform device-independent color space, as the LabCIE color space, may be used too, appearance device-independent color space that includes viewing conditions, as the CIECAM color spaces, may be used too.

A polygon is a connected two-dimensional figure bounded by line segments, called sides, with exactly two sides meeting at each vertex. A polygon is a multi-sided elementary object composed of edges, vertices, and triangles. An edge is a line segment that forms one side of a polygon. A vertex is a point at which two edges meet. A triangle is the area enclosed by three vertices. The most basic polygon is a triangle. Since the three points of a triangle must always be on the same plane, we can say that all triangles are planar. Other examples of polygons are rectangles, pentagons, hexagons, octagons, decagons.

Preferably, each elementary polygon is defined by vertices that corresponds to said selected gamut boundary colors. Alternatively, each selected gamut boundary color belongs to an elementary polygon.

In summary, in order to preserve the discontinuities of an actual gamut surface and/or the discontinuities of its curvature, notably through a smoothing operation, in the method according to the invention, when at least a vertex of any elementary polygon, the network of which represents an actual gamut boundary, belongs either to a line or a point of discontinuity of this actual gamut boundary, either to a line or a point of discontinuity of curvature of said actual gamut boundary, or both, metadata related to this belongings are added to the definition of the elementary polygons.

More precisely and preferably, said generation of gamut boundary descriptor from said network of elementary polygons is performed through a smoothing or an interpolation of said network of said elementary polygons in order to create a gamut boundary descriptor that is closer to said actual gamut boundary than said network of said elementary polygons, and said smoothing or interpolation:

does not change the position of the vertices and at the edges of elementary polygons that belongs either to a line or a point of discontinuity of said actual gamut boundary, either to a line or a point of discontinuity of curvature of said actual gamut boundary, and/or does not change the discontinuity of curvature of said actual gamut boundary at the vertices and at the edges of elementary polygons that belongs to a line or a point of discontinuity of curvature of said actual gamut boundary.

Thank to the invention, a gamut boundary descriptor is obtained that is closer to the actual gamut boundary than the gamut boundary descriptor of the prior art, even after smoothing or interpolation of the basic network of elementary polygons that is used to represent this gamut boundary. Advantageously, the discontinuities of the actual gamut surface are preserved, and/or the discontinuities of the curvature of the actual gamut surface are preserved.

Preferably, when at least a vertex of any elementary polygon belongs to a line or a point of discontinuity of said actual gamut boundary, and/or belongs to a line or a point of discontinuity of curvature of said actual gamut boundary, metadata related to this belongings are added to the definition of said elementary polygons, and are used to indicate which vertices or edges of elementary polygons do not change their position during said smoothing or interpolation, and to indicate which discontinuity of curvature does not change during said smoothing or interpolation at the vertices and at the edges of elementary polygons.

The subject of the invention is also a method of gamut mapping source colors of a source color device into target colors of a target color device in a transformation color space, comprising the steps of:

creating a source color device gamut descriptor and a target color device gamut descriptor, wherein the creation of the source color device gamut descriptor and/or the creation of the target color device gamut descriptor is performed according to the invention, defining a color transform that is adapted to map any source color lying in said source color device gamut descriptor into a target color lying in said target color device gamut descriptor, applying said color transform to source colors to map to get said mapped target colors in said transformation color space.

The subject of the invention is also any gamut mapping system that is able to implement the gamut mapping method according to the invention.

BRIEF DESCRIPTION OF THE DRAWINGS

The invention will be more clearly understood on reading the description which follows, given by way of a non-limiting example and with reference to the appended figures in which:

FIG. 4 illustrates another example of a GBD: 4-A: surface visualization with edges (white dashed lines) and summits (white circles)—4-B: visualization of elementary triangles of the GBD;

DETAILED DESCRIPTION

According to the following non-limiting example of the invention, the method of creating a gamut boundary descriptor of the actual gamut boundary of a source color device in a transformation color space comprises the following parts:

1—generation of an initial Gamut Boundary Description,
2—identification of singular vertices of the actual gamut boundary,
3—amendment of the initial Gamut Boundary Description,
4—smoothing and generation of a final Gamut Boundary Description.

1—Generation of an Initial Gamut Boundary Description

For calculation of gamuts of additive source color display devices such as CRT monitors or additive capturing devices such as CRT cameras, the device gamut boundary can be assumed to be convex thanks to the color mixing properties of additive color reproduction. Such gamuts can be represented classically by convex hulls in linear color spaces. We use here CIEXYZ space as linear transformation color space.

Usual convex hull algorithms aim to calculate a representation of surface being the convex hull of a set of given points. We use here the so-called incremental algorithm, but other well-known algorithms such as gift warp or divide-and-conquer can be used instead.

We assume that a number of source color values are available that are able to sample precisely enough the actual color gamut. These source colors are points in the three-dimension CIEXYZ transformation color space. From these points or a selection of these points, an initial or <<basic>> source convex Gamut Boundary Description (GBD) is to be classically generated.

The initial source GBD describes the two-dimensional surface of a three-dimensional source color gamut in a color space. The GBD is based on an indexed triangle set. Triangles are elementary polygons. As shown on FIG. 3, this initial GBD then generates a basic network of elementary polygons that represents the actual gamut boundary of the source color device in the transformation color space.

Figure 3:
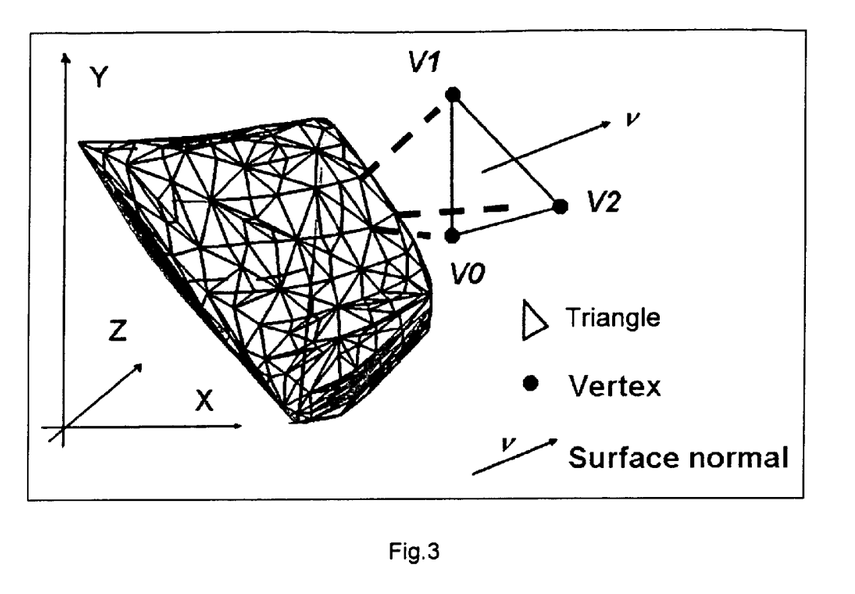
FIG. 3 illustrates an example of an initial GBD made of network of elementary triangles in the CIEXYZ color space.

This initial source GBD shown in FIG. 3 contains a set of vertices V0, V1, V2, V3, . . . . Each vertex is defined by its coordinates in the CIEXYZ transformation color space. Coordinates in CIEXYZ color space are encoded in standardized RGB or YCbCr values.

This initial source GBD contains a set of triangles F0, F1, F2, F3, . . . . Let F0 being the sample triangle shown in FIG. 3. Triangle F0 is defined by three indices 0, 1, 2 of its three vertices V0, V1, V2. The set of triangles is called indexed triangle set. The surface normal v of a triangle points outside the gamut. According to the order of indices 0, 1, 2 the surface normal of F0 is defined as follows:

$$v = \frac{(V2-V0) \times (V1-V0)}{|V2-V0| \cdot |V1-V0|},$$

with |•| with being the vector length operator.

From the selected points that sample the surface of the actual gamut in the transformation color space, the following known incremental convex hull algorithm can used here to build a convex hull that represent the initial source gamut boundary, while the vertices of the indexed triangle set are a subset of the given points. To implement this known algorithm, the following steps are generally carried out:

1) creation of a first hull (a tetrahedron) from any four selected points in the source color gamut;
2) take a new point;
3) if the new point is inside the first hull, go on with step 2;
4) as the new point is now outside the first hull, delete all triangles from the first hull that are visible by this new point;
5) create new triangles including the new point to make a second hull;
6) If not all points have been processed, go on with step 2;
7) as all selected points have now been processes, the last hull gives the initial gamut boundary descriptor.

A more detailed explanation of this known algorithm is given in Tim Lambert, Interactive Java demos of convex hull algorithms, School of Computer Science and Engineering, University of New South Wales, downloaded from the WWW on Wednesday, Sep. 13, 2006 (see for instance the following website: http://www.cse.unsw.edu.au/~lambert/java/3d/hull.html).

2—Identification of Singular Vertices

The objective of this second step is to identify the vertices of any elementary polygon that belong either to a line or a point of discontinuity of the actual gamut boundary, either to a line or a point of discontinuity of curvature of the actual gamut boundary.

Such an identification is performed in order to complement, according to the invention, the definition of the elementary triangles that are part of the initial GBD, with mentioning any vertex of an elementary triangle that belongs either to a line or a point of discontinuity of the actual source gamut boundary, either to a line or a point of discontinuity of curvature of the actual source gamut boundary.

The device independent source color values are given in the CIEXYZ transformation color space, as the corresponding device dependent source color values are given in a classical so-called RGB color space. These values are classically measured from a three primary display device such as CRT or digital projector.

According to a first method of identification, singular vertices are detected from given device dependent RGB color values and device independent CIEXYZ color values. Here, two types of shape singularities are detected as follows:

Eight summits are identified:
1) R and G and B minimum,
2) R maximum, G and B minimum,
3) G maximum, R and B minimum,
4) B maximum, R and G minimum,
5) R and G maximum, B at minimum,
6) R and B maximum, G at minimum,
7) G and B maximum, R at minimum,
8) R and G and B maximum.

then, twelve ridges are identified:
1) all colors with R and G at minimum,
2) all colors with G and B at minimum,
3) all colors with R and B at minimum,
4) all colors with R at maximum and G at minimum,
5) all colors with G at maximum and B at minimum,
6) all colors with R at maximum and B at minimum,
7) all colors with G at maximum and R at minimum,
8) all colors with B at maximum and G at minimum,
9) all colors with B at maximum and R at minimum,
10) all colors with R and G at maximum,
11) all colors with G and B at maximum,
12) all colors with R and B at maximum.

The singular vertices are all detected summits and all vertices belong to a detected ridge.

Figure 4:
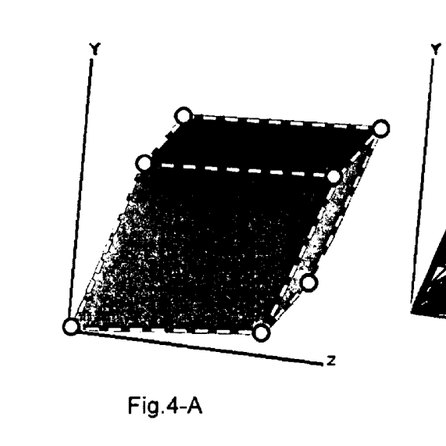

FIG. 4-A shows an example of a source gamut boundary with eight summits (white circles—only seven are visible) and twelve edges (white dashed line—only eight are visible). All vertices not marked as summits or not marked as edges as assumed to represent a smooth part of the gamut boundary. FIG. 4-B shows the network of elementary triangles being the initial GBD representing the actual source gamut boundary.

Figure 5:
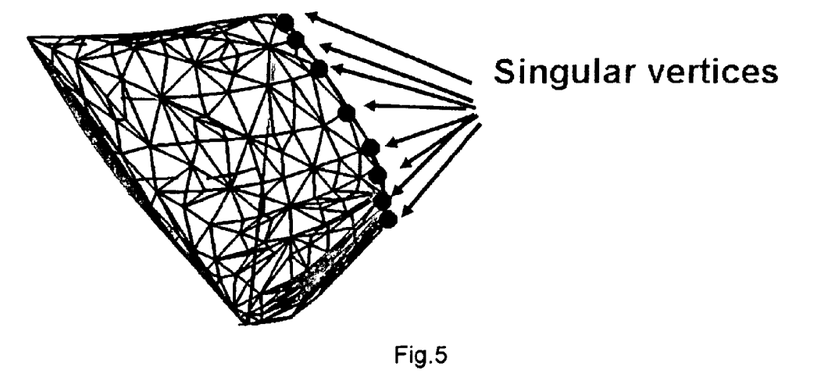
FIG. 5 illustrates still another example of a GBD having a series of singular vertices (black circles) marking a ridge of the gamut boundary.

According to a second method of identification, singular vertices can be detected without having device-dependent RGB color values available, only exploiting CIEXYZ device independent color values. FIG. 5 shows an example of a source GBD in the CIEXYZ transformation color space. In order to detect singular vertices, the inner solid angles of all vertices are for instance calculated according to the following three steps:

1) the inner solid angle 52 of a vertex is cut into N several partial solid angles $\Omega_0, \Omega_1, \Omega_2, \ldots, \Omega_n, \ldots, \Omega_{N-1}$, each $\Omega_n$ of those described by a tetrahedron $T_n$;

2) for each tetrahedron $T_n$, the associated inner solid angle $\Omega_n$ is calculated. According to Girard's theorem [see for instance, from Andrew Thomson, "Solid angles and Girard's Theorem", mathematics course at University of British Columbia, Ref. 22292031, Math 308, Dec. 16, 2005], the inner solid angle $\Omega_n$ is calculated from the three inner angles $\Phi_{n,i}$; $0 \le i \le 2$ of the spherical triangle on the unit sphere around the vertex defined by the intersection of the triangles of the tetrahedron as follows:

$$\Omega_n = \left(\sum_{i=0}^{2} \Phi_{n,i}\right) - \pi.$$

3) the inner solid angle $\Omega$ is then calculated according to the formula:

$$\Omega = \sum_{n=0}^{N-1} \Omega_n.$$

All vertices having a solid angle $\Omega$ smaller than a given threshold are then declared «singular vertices". A typical threshold is $\pi/2$. After detection of singular vertices, the triangle set is simplified in order to have a smaller memory foot print. The simplification eliminates a given percentage of vertices that are regularity distributed on the gamut boundary. A typical percentage is 50%. The simplification excludes all detected singular vertices from elimination.

In order to describe more precisely the singularities, as the summits and edges, of a gamut boundary, several geometrical measures exist. For example, when two vertices of an elementary polygon are part of an edge, and when at each side of this edge there is a triangle that includes both vertices, then the interior angle between those two triangles is called the dihedral angle. For description of a vertex of a three-dimensional polyhedron (summit or not), the inner solid angle can be used that is formed by all triangles neighbouring the vertex.

3—Amendment of the Initial Gamut Boundary Description

According to the previous step 2, a list of identified vertices of the elementary triangles that belong either to a line or a point of discontinuity of the actual gamut boundary, either to a line or a point of discontinuity of curvature of the actual gamut boundary is now available. The objective of this third step is now to add metadata related to this belonging to the geometrical definition of the elementary polygons.

According to the invention, the initial GBD has to be amended by information showing which vertex of any triangle belongs either to a line or a point of discontinuity of the actual gamut boundary, and/or to a line or a point of discontinuity of curvature of the actual gamut boundary. This amended information is metadata that is added to the definition of the elementary polygon. The elementary polygons and the metadata are encoded into a binary format as follows.

The binary format consists in a header, a triangle part and a vertex part. The first part is a header that is detailed in table 1.

TABLE 1

| Address | Size | Name of field | Symbol | Description | Values |
|---|---|---|---|---|---|
| 0 | 2 | ID_MAGICK | | Magick number | 45962 |
| 8 | 2 | ID_F | | Offset to set of Facets | [0; 65535] |
| 10 | 2 | ID_V | | Offset to set of Vertices | [0; 65535] |
| 12 | 1 | ID_HEADER | N | See below | See below |

Encoding of 16 bit integer values into 2 bytes is the MSBs in the first byte and the LSBs in the second byte. The field ID_MAGICK contains a fixed 2 byte magick number that can help to detect the start of the GBD.

As already explained, the GBD is defined by triangles in the transformation color space. The field ID_F gives the offset in bytes from the beginning of the Gamut ID to the position where the triangles are defined.

A triangle is defined by indexing three vertices in the transformation color space. The field ID_V gives the offset in bytes from the beginning of the Gamut ID to the position where the vertices are defined.

The ID_HEADER field is composed of the ID_COLOR_SPACE, and the ID_PRECISION fields as is detailed in table 2.

TABLE 2

| | ID_HEADER | | | | | | | |
|---|---|---|---|---|---|---|---|---|
| | Bit | | | | | | | |
| | 7 | 6 | 5 | 4 | 3 | 2 | 1 | 0 |
| Meaning | ID_COLOR_SPACE | | | ID_PRECISION | | | Not used | |

The GBD uses one of the following three color spaces and the according color encoding rules indicated by the field ID_COLOR_SPACE:

0: RGB according to SMPTE 274M (ITU-R BT.709 colorimetry);

1: YCbCr according to IEC 61966-2-4-SD (ITU-R BT.601 colorimetry);

2: YCbCr according to IEC 61966-2-4-HD (ITU-R BT.709 colorimetry).

3-7: reserved

Color encoding is defined according to the chosen color space. Color precision is defined by the ID_PRECISION field and can be, for instance:

0: N=8 bit;

1: N=10 bit;

2: N=12 bit.

The ID_F field of the header indicates the start of the description of triangles. The triangles are defined by a triangle header and by a triangle body is detailed in table 3.

The triangle body contains the description of F triangles. For each triangle, three indices of vertexes are contained.

With an offset indicated in the ID_V field of the header begins the description of the vertices. The vertices are defined by the fields that are detailed in table 4.

TABLE 3

| Address | Size | Name of field | Symbol | Description | Values |
|---|---|---|---|---|---|
| ID_F | 2 | ID_NUMBER_F | F | Total number of triangles | 1 < F < 65535 |
| ID_F + 2 | [3F[ld(V)]/8] | ID_F_BODY | | 3F indices of vertices | [0; V − 1] is a valid indices of vertices |

Hereby is $\lceil \bullet \rceil$ the operation that rounds to the next upper integer.

The amended information of metadata consists of the following fields:

the field ID_NUMBER_R1 indicates the number of vertices belonging to a discontinuity of the actual gamut boundary;

the field ID_NUMBER_R2 indicates the of vertices belonging to a discontinuity of the curvature of the actual gamut boundary;

At address ID_V+6+$\lceil 3VN/8 \rceil$ are stored R1 indices of vertices that belong to a discontinuity of the actual gamut boundary;

At address ID_V+6+$\lceil 3VN/8 \rceil$+$\lceil R1\lceil ld(V) \rceil/8 \rceil$ are stored R2 indices of vertices that belong to a discontinuity of the curvature of the actual gamut boundary;

The vertices belonging to a discontinuity of the actual gamut boundary or a discontinuity of the curvature of the actual gamut boundary are a subset of all vertices. Since we have V vertices, each index of a bertex takes $\lceil (V)8 \rceil$ bits.

The initial gamut boundary descriptor is now amended, according the invention with spatially localized metadata There are many known methods for smooth interpolation of a given number of points.

In order to generate a final GBD that is smoother than the initial GBD, the following steps are then carried out:

1) A smooth surface $\Psi(X,Y,Z)$ is reconstructed from the vertices of the initial GBD according to any known method of smooth interpolation. The smooth surface passes through all said vertices.

2) For each triangle of the initial GBD, an additional vertex is generated being the intersection of $\Psi(X,Y,Z)$ and the line vertical to the triangle going through the center of gravity of this triangle.

3) In order to ensure a convex final GBD, all new vertices lying inside the initial GBD are eliminated.

4) In order to preserve the discontinuities of the actual gamut surface and the discontinuities of the curvature of the actual gamut surface indicated by the singular vertices of the initial GBD that have been previously identified, as a main objective of the invention, all new vertices are eliminated that belong to a triangle that has at least one singular vertex.

5) Each of the remaining triangles with a new vertex associated is replaced by a set of three new triangles each linking the new vertex with two existing vertices.

TABLE 4

| Address | Size | Name of field | Symbol | Description | Values |
|---|---|---|---|---|---|
| ID_V | 2 | ID_NUMBER_V | V | Total number of Vertices | 1 < V < 65535 |
| ID_V + 2 | 2 | ID_NUMBER_R1 | R1 | Number of vertices belonging to a discontinuity of the actual gamut boundary | 0 ≤ R1 ≤ V |
| UD_V + 4 | 2 | ID_NUMBER_R2 | R2 | Number of vertices belonging to a discontinuity of the curvature of the actual gamut boundary | 0 ≤ R2 ≤ V |
| ID_V + 6 | $\lceil 3VN/8 \rceil$ | ID_F_BODY | | For each vertex, three color values | According to color encoding |
| ID_V + 6 + $\lceil 3VN/8 \rceil$ | $\lceil R1\lceil ld(V) \rceil/8 \rceil$ | | | R1 indices of vertices belonging to a discontinuity of the curvature of the actual gamut boundary | [0; V − 1] Must be a valid indices of vertices |
| ID_V + 6 + $\lceil 3VN/8 \rceil$ + $\lceil R1\lceil ld(V) \rceil/8 \rceil$ | $\lceil R2\lceil ld(V) \rceil/8 \rceil$ | | | R2 indices of vertices belonging to a discontinuity of the curvature of the actual gamut boundary | [0; V − 1] Must be a valid indices of vertices |

4—Smoothing and Generation of the Final Gamut Boundary Description

In the INRIA research report 3985 from August 2000 entitled "Smooth Surface Reconstruction via Natural Neighbour Interpolation of Distance Functions", Jean-Daniel Boissonnat and Frédéric Cazals describe a method to smooth a GBD represented by a set of triangles. In order to smooth an initial surface represented by this set of triangles, the following steps are used:

1) a smooth surface $\Psi(X,Y,Z)$ is reconstructed from the given points (vertices) being a smooth manifold passing through all the points. This surface is implicitly represented as the zero-set of some pseudo distance function.

2) from this smooth reconstructed surface, additional vertices are generated and linked to the given set of triangles by Delaunay triangulation.

Step no. 4 above ensures that the final GBD preserves the discontinuity of shape and the discontinuity of shape curvature of the actual gamut boundary even if this discontinuity is not present in the reconstructed smooth surface. Thank to the invention, a final source gamut boundary descriptor is then obtained that is closer to the actual gamut boundary than the gamut boundary descriptor of the prior art, even after smoothing or interpolation of the basic network of elementary polygons that is used to represent this gamut boundary.

According to a variant of the invention, only the discontinuities of the actual gamut surface are preserved, or only the discontinuities of the curvature of the actual gamut surface are preserved.

In summary, the invention consists of a method of creating a gamut boundary descriptor for color gamuts with amended spatially localized metadata. The invention has the following advantages with respect to known gamut boundary descriptions (GBD):

Allows approximated GBD while preserving shape singularities and/or shape curvature singularities, Enables GBD interpolation and/or smoothing with consideration of shape singularities and/or shape curvature singularities, Allows handling of specific parts of color space such as white point, black point and primary colors.

Figure 6:
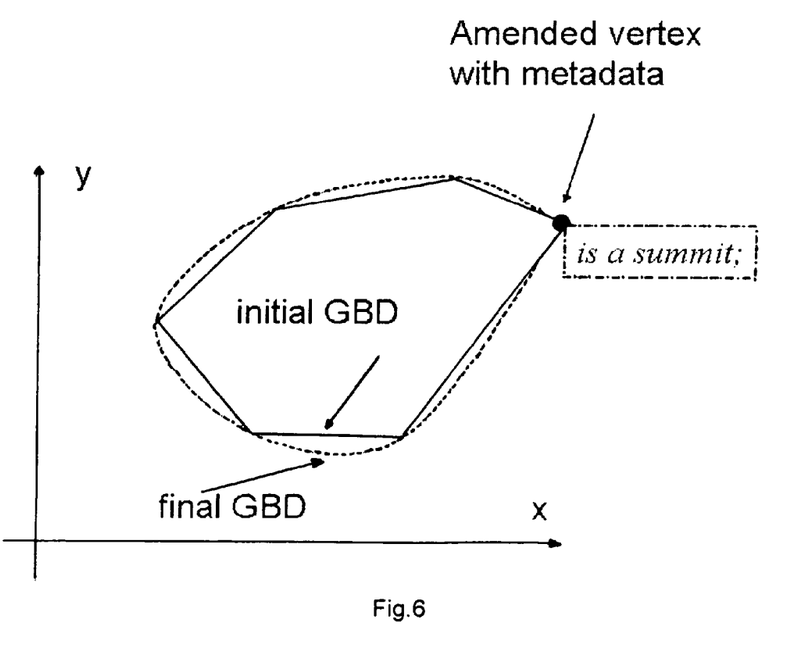
FIG. 6 describes the final GBD that is obtained from an initial GBD according to an embodiment of the invention.

A main idea of the invention is illustrated in FIG. 6, using as an example a two-dimensional color space xy, where a 2D polygon represents an initial GBD. According to the invention, as one of the vertices of the polygon has spatially localized metadata associated, a flag indicating the presence of a summit prevent the position of this summit to be changed by a smooth interpolation of the polygon that is performed to get the final GBD.

The final source gamut boundary descriptor that have been described can now be used to map, in the same or another transformation color space, any source colors of the source color device into target colors of a target color device. A gamut mapping implementation will now be exemplified by defining a color transform that is adapted to map any source color lying in the source color device gamut descriptor into a target color lying in a target color device gamut descriptor.

Gamut mapping is now carried out in the CIELab color space. The smoothed final GBD is transformed from CIEXYZ space into CIELab space by transforming simply the color coordinates of the vertices. The use of the final, smooth GBD has an important advantage over the use of the initial GBD. Since the final GBD has more vertices, the incorrectness of planar triangles in non-linear CIELab space has less influence if the number of vertices is larger and triangles are smaller.

For gamut mapping, straight lines are used classically as mapping curves defined as all lines crossing the point—called anchor point—on the lightness axis with L=50. As a known variant, other anchor points or multiple anchor points can be used.

Each source color is mapped onto a target color in direction to the anchor point such that the target color is inside the target gamut. Since straight lines are chosen as mapping trajectory, the mapping can be described as a modification of distance D of the source color into the distance D' of the target color. In this case, known algorithms can be used for mapping.

In the paper of Montag and Fairchild entitled "Gamut mapping: Evaluation of chroma clipping techniques for three destination gamuts" published in 1998 at the IS&T/SID Sixth Color Imaging Conference in Scottsdale, four mapping techniques are described: scaling-clipping, knee-function mapping, Gentile's mapping, and three segments mapping.

To map a source color with a distance D into a target color with a distance D' on a given mapping trajectory, we use here a mapping function along a mapping curve which is defined by three segments:

a first segment with a mapping "slope" equal to 1 (i.e. D'=D), where the mapping "slope" is the ratio D'/D.

a last segment being a so-called hard clipping (i.e. D'=$D_{output}^{MAX}$=const.), and a middle segment connecting linearly the first segment with the last segment, as expressed below.

Globally, the distance D' of a target color is expressed in function of the distance D of a source color on the same mapping trajectory as follows:

$$D' = \begin{cases} D & 0 \leq D \leq D_{inflection} \\ \dfrac{(D_{output}^{MAX} - D_{inflection})(D - D_{inflection})}{D_{clipping} - D_{inflection}} & \text{if } D_{inflection} < D \leq D_{clipping} \\ D_{output}^{MAX} & D_{clipping} < D \leq D_{input}^{MAX} \end{cases}$$

where D is the value we want to map; $D_{input}^{MAX}$ is the maximum input value, for example determined by the limits of CIE L*a*b* space; $D_{output}^{MAX}$ is the maximum output value.

This mapping function D'=f(D) uses two parameters:

$D_{inflection}$ which is the distance where the first segment (of slope one) stops and the middle segment begins, $D_{clipping}$ is the distance where the middle segment stops and the last segment of hard clipping begins; this distance is the so-called cut off value for clipping.

Figure 7:
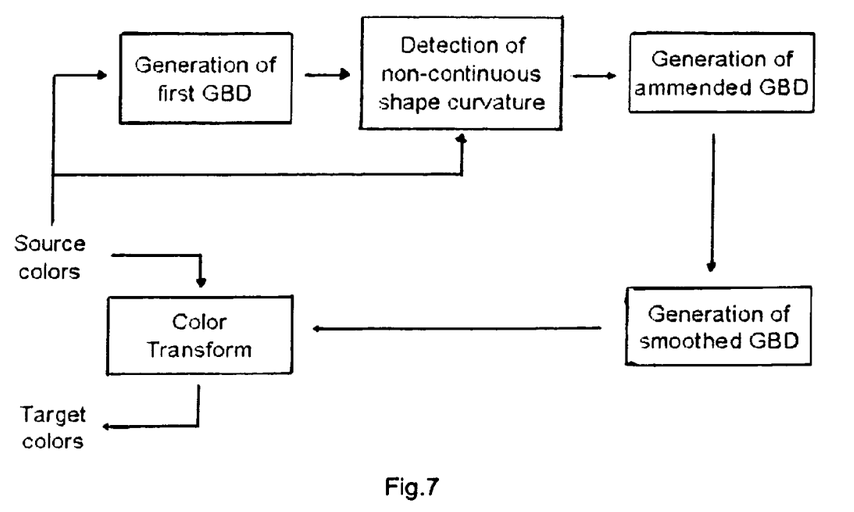
FIG. 7 is a summary diagram of the gamut mapping method according to an embodiment of the invention.

A color transform that is adapted to map any source color lying in the final source color device gamut descriptor into a target color is now obtained, according to the invention, giving globally a method of gamut mapping source colors of a source color device into target colors of a target color device that is represented on FIG. 7 and summarized as follows:

1) In a color space having several dimensions described by color coordinates, an initial Gamut Boundary Description (GBD) is generated from a number of given color values representing colors of a color gamut in the color space, such that a part of said colors build the vertices of a polytope.

2) A subset of said vertices is identified as singular vertices that present non-continuous gamut shape curvature being either:

summits, i.e. singular vertices having no, exactly one or more that two singular neighbors), or edges, i.e. connected singular neighbored vertices each having one or two singular neighbors, 3) The initial GBD is amended by spatially localized metadata for said singular vertices that consists in information indicating the presence or absence and the type of shape singularities.

4) A smoothing operator generates a final GBD from the first one exploiting the spatially localized metadata in a way that the character of non continuous shape at the singular vertices of the first GBD is maintained in the final GBD.

5) A color transform is defined from the final GBD that maps colors in the color space in a way that all mapped colors are inside the final GBD.

In a variation of the invention, each of said color values consists of a set of device independent color values and their corresponding device dependent color values. For the generation of the initial GBD, the subset of singular vertices are colors with either minimal or maximal device-dependent color values in at least N−1 coordinates, where N is the dimension of the color space.

In another variation, each of said color values contains also a set of psycho-visual color values in a psycho-visually uniform color space, wherein the singular vertices have associated at least one inner solid angle of the gamut in at least one color space and the smoothing operator optimized the smoothed shape with respect to these given angles in a way that the final GBD has a shape corresponding to the solid angles.

It will be understood that the present invention has been described purely by way of example, and modifications of detail can be made without departing from the scope of the invention.

Each feature disclosed in the description and (where appropriate) the claims and drawings may be provided independently or in any appropriate combination. Features may, where appropriate be implemented in hardware, software, or a combination of the two. Connections may, where applicable, be implemented as wireless connections or wired, not necessarily direct or dedicated, connections.

While the present invention is described with respect to particular examples and preferred embodiments, it is understood that the present invention is not limited to these examples and embodiments. The present invention as claimed therefore includes variations from the particular examples and preferred embodiments described herein, as will be apparent to one of skill in the art. While some of the specific embodiments may be described and claimed separately, it is understood that the various features of embodiments described and claimed herein may be used in combination.

The invention claimed is:

1. Method of creating a gamut boundary descriptor of an actual gamut boundary of all colors that can be output by a color device, comprising the-steps of:

using an intermediate color device executing:
in a transformation color space, selecting gamut boundary colors sampling a surface of said actual gamut boundary,
using said selected gamut boundary colors, generating a network of elementary polygons representing said actual gamut boundary, each selected gamut boundary color belonging to an elementary polygon,
generating an initial gamut boundary descriptor from said network of elementary polygons,
identifying vertices and edges of elementary polygons that belong to a line or a point of discontinuity of said actual gamut boundary,
smoothing said initial gamut boundary descriptor into a final gamut boundary descriptor that is closer to said actual gamut boundary than said initial gamut boundary descriptor,
wherein said smoothing:
does not change position of the identified vertices and of the identified edges,
does not change the discontinuities of curvature of said actual gamut boundary at said identified vertices and at said identified edges; and
using the final gamut boundary descriptor to output an image by the color device.

2. Method of creating a gamut boundary descriptor according to claim 1, further comprising the step of adding metadata related to said identified vertices and said identified edges to a definition of corresponding elementary polygons, wherein said metadata are used to indicate which vertices or edges of elementary polygons do not change their position during said smoothing and to indicate which discontinuity of curvature of said actual gamut boundary at said identified vertices and at said identified edges does not change during said smoothing 3. Use of the method according to claim 1, for creating a source color device gamut descriptor and/or a target color device gamut descriptor in a process of gamut mapping source colors of a source color device into target colors of a target color device in a transformation color space, said process comprising the steps of:

defining a color transform that is adapted to map any source color lying in said source color device gamut descriptor into a target color lying in said target color device gamut descriptor, and,
applying said color transform to source colors to map to get said mapped target colors in said transformation color space.

4. Method according to claim 1, wherein said identification of vertices and edges is performed by exploiting both device dependent ROB color values and device independent CIEXYZ color values.

5. Method according to claim 1, wherein said identification of vertices and edges is performed by exploiting only device independent CIEXYZ color values, without exploiting device dependent ROB color values.

6. Method according to claim 1, wherein said identification of vertices and edges comprises the steps of calculating inner solid angles of all vertices and edges and classifying identified vertices or edges the vertices or edges that have a calculated inner solid angle smaller than a given threshold.

7. Method according to claim 6 wherein said identification of vertices and edges also comprises a simplification of the network of elementary polygons of the initial gamut boundary descriptor.

* * * * *

UNITED STATES PATENT AND TRADEMARK OFFICE
CERTIFICATE OF CORRECTION

PATENT NO. : 8,941,679 B2
APPLICATION NO. : 12/452294
DATED : January 27, 2015
INVENTOR(S) : Jurgen Stauder et al.

Page 1 of 1

It is certified that error appears in the above-identified patent and that said Letters Patent is hereby corrected as shown below:

In the Claims

Col. 13, line 20, should read as follows:

1. Method of creating a gamut boundary descriptor of an actual gamut boundary of all colors that can be output by a color device, comprising the steps of:
  - using an intermediate color device executing:
  - in a transformation color space, selecting gamut boundary colors sampling a surface of said actual gamut boundary,
  - using said selected gamut boundary colors, generating a network of elementary polygons representing said actual gamut boundary, each selected gamut boundary color belonging to an elementary polygon,
  - generating an initial gamut boundary descriptor from said network of elementary polygons,
  - identifying vertices and edges of elementary polygons that belong to a line or a point of discontinuity of said actual gamut boundary,
  - smoothing said initial gamut boundary descriptor into a final gamut boundary descriptor that is closer to said actual gamut boundary than said initial gamut boundary descriptor,
   wherein said smoothing:
  - does not change position of the identified vertices and of the identified edges,
  - does not change the discontinuities of curvature of said actual gamut boundary at said identified vertices and at said identified edges; and,
  - using the final gamut boundary descriptor to output an image by the color device.

Signed and Sealed this
Eighteenth Day of August, 2015

Michelle K. Lee
*Director of the United States Patent and Trademark Office*